US007895537B2

(12) United States Patent
Gruen et al.

(10) Patent No.: US 7,895,537 B2
(45) Date of Patent: Feb. 22, 2011

(54) METHOD AND APPARATUS FOR SETTING ATTRIBUTES AND INITIATING ACTIONS THROUGH GESTURES

(75) Inventors: Daniel M. Gruen, Newton, MA (US); Li-Te Cheng, Malden, MA (US); Devon J. Rueckner, West Roxbury, MA (US)

(73) Assignee: International Business Machines Corporation, Armonk, NY (US)

( * ) Notice: Subject to any disclaimer, the term of this patent is extended or adjusted under 35 U.S.C. 154(b) by 2245 days.

(21) Appl. No.: 10/745,533

(22) Filed: Dec. 29, 2003

(65) Prior Publication Data
US 2005/0160372 A1 Jul. 21, 2005

(51) Int. Cl.
*G06F 3/033* (2006.01)
(52) U.S. Cl. .................. 715/863; 715/810; 715/831; 715/835; 715/860; 715/866
(58) Field of Classification Search .......... 715/521, 715/769, 773, 810, 828, 831, 835, 847, 860, 715/863, 866
See application file for complete search history.

(56) References Cited

U.S. PATENT DOCUMENTS

| 4,694,406 A | | 9/1987 | Shibui et al. ............... 364/518 |
| 5,038,138 A | | 8/1991 | Akiyama et al. ........... 340/724 |
| 5,252,951 A | * | 10/1993 | Tannenbaum et al. ....... 345/156 |
| 5,297,253 A | | 3/1994 | Meisel ....................... 395/160 |
| 5,317,306 A | | 5/1994 | Abraham et al. ............ 345/118 |
| 5,361,361 A | | 11/1994 | Hickman et al. ............ 395/700 |
| 5,398,310 A | | 3/1995 | Tchao et al. ................ 395/144 |
| 5,485,565 A | * | 1/1996 | Saund et al. ................ 345/442 |
| 5,515,496 A | * | 5/1996 | Kaehler et al. ............. 715/762 |
| 5,563,996 A | | 10/1996 | Tchao ........................ 395/144 |
| 5,708,787 A | | 1/1998 | Nakano et al. .............. 395/352 |
| 5,732,399 A | | 3/1998 | Katiyar et al. ............... 705/5 |
| 5,760,773 A | * | 6/1998 | Berman et al. .............. 715/808 |
| 5,781,662 A | * | 7/1998 | Mori et al. .................. 382/189 |
| 5,831,617 A | | 11/1998 | Bhukhanwala .............. 345/349 |
| 5,870,770 A | | 2/1999 | Wolfe ......................... 707/501 |

(Continued)

FOREIGN PATENT DOCUMENTS

JP 08-286871 11/1996

OTHER PUBLICATIONS

Venolia, Gina, et al., "Understanding Sequence and Reply Relationships within Email Conversations: A Mixed-Model Visualization" *Paper: Integrating Tools and Tasks*, vol. No. 5, Issue No. 1, Proceedings of the Conference on Human Factors in Computer Systems, Ft. Lauderdale, Florida, Apr. 5-10, 2003, pp. 361-368.

(Continued)

*Primary Examiner*—Weilun Lo
*Assistant Examiner*—Eric Wiener
(74) *Attorney, Agent, or Firm*—Pillsbury Winthrop Shaw Pittman LLP

(57) ABSTRACT

An apparatus and method is provided for setting attributes and initiating actions associated with list items. An action icon menu is displayed with options for a user to select related to each item in the list. The user may set an item from the list for a selected action by choosing from the action icon menu or by performing a gesture associated with the desired action.

12 Claims, 15 Drawing Sheets

U.S. PATENT DOCUMENTS

| | | | | |
|---|---|---|---|---|
| 5,917,493 | A | * | 6/1999 | Tan et al. .................... 715/835 |
| 5,918,233 | A | | 6/1999 | La Chance et al. .......... 707/104 |
| 5,920,313 | A | | 7/1999 | Diedrichsen et al. ........ 345/339 |
| 6,003,034 | A | | 12/1999 | Tuli ........................... 707/101 |
| 6,018,346 | A | * | 1/2000 | Moran et al. ................ 715/863 |
| 6,084,951 | A | | 7/2000 | Smith et al. ............... 379/93.17 |
| 6,088,030 | A | | 7/2000 | Bertram et al. ............. 345/349 |
| 6,147,670 | A | | 11/2000 | Rossmann .................. 345/123 |
| 6,169,911 | B1 | | 1/2001 | Wagner et al. .............. 455/566 |
| 6,184,881 | B1 | | 2/2001 | Medl ......................... 345/339 |
| 6,209,009 | B1 | | 3/2001 | Schwartz et al. ............ 707/517 |
| 6,239,801 | B1 | * | 5/2001 | Chiu et al. ................ 715/500.1 |
| 6,246,411 | B1 | * | 6/2001 | Strauss ....................... 715/863 |
| 6,247,020 | B1 | | 6/2001 | Minard ....................... 707/104 |
| 6,289,361 | B1 | | 9/2001 | Uchida ....................... 707/501 |
| 6,292,179 | B1 | * | 9/2001 | Lee ............................ 345/173 |
| 6,340,979 | B1 | * | 1/2002 | Beaton et al. ............... 715/764 |
| 6,377,288 | B1 | * | 4/2002 | Moran et al. ................ 715/863 |
| 6,507,349 | B1 | | 1/2003 | Balassanian ................ 345/676 |
| 6,509,912 | B1 | * | 1/2003 | Moran et al. ................ 715/762 |
| 6,582,474 | B2 | | 6/2003 | LaMarca et al. ............ 715/500 |
| 6,613,100 | B2 | | 9/2003 | Miller ........................ 715/526 |
| 6,618,732 | B1 | | 9/2003 | White et al. ................ 707/106 |
| 6,664,991 | B1 | * | 12/2003 | Chew et al. ................. 715/863 |
| 6,700,591 | B1 | | 3/2004 | Sharpe ....................... 345/762 |
| 6,738,973 | B1 | | 5/2004 | Rekimoto ................... 715/104 |
| 6,754,873 | B1 | | 6/2004 | Law et al. ................. 715/501.1 |
| 6,782,393 | B1 | | 8/2004 | Balabanovic et al. .... 707/104.1 |
| 6,829,601 | B2 | | 12/2004 | Honda et al. .................. 707/4 |
| 6,829,668 | B2 | | 12/2004 | Keskar et al. ............... 710/305 |
| 6,865,404 | B1 | | 3/2005 | Tikkala et al. .............. 455/566 |
| 6,938,207 | B1 | | 8/2005 | Haynes ....................... 715/711 |
| 6,963,904 | B2 | | 11/2005 | Yong .......................... 709/207 |
| 6,972,776 | B2 | | 12/2005 | Davis et al. ................. 345/684 |
| 6,985,893 | B1 | | 1/2006 | Warner et al. .................. 707/2 |
| 7,036,077 | B2 | * | 4/2006 | Saund et al. ................ 715/530 |
| 7,058,902 | B2 | * | 6/2006 | Iwema et al. ............... 715/810 |
| 7,093,202 | B2 | * | 8/2006 | Saund et al. ................ 715/863 |
| 7,107,077 | B2 | | 9/2006 | Lee ............................ 455/566 |
| 7,127,476 | B2 | | 10/2006 | Narahara .................... 707/203 |
| 7,177,665 | B2 | | 2/2007 | Ishigaki ................... 455/556.2 |
| 7,188,320 | B1 | | 3/2007 | Landers ...................... 715/850 |
| 7,406,666 | B2 | * | 7/2008 | Davis et al. ................. 715/863 |
| 7,421,690 | B2 | | 9/2008 | Forstall et al. .............. 718/100 |
| 7,665,041 | B2 | * | 2/2010 | Wilson et al. ............... 715/860 |
| 7,725,547 | B2 | * | 5/2010 | Albertson et al. ........... 709/206 |
| 2001/0039553 | A1 | | 11/2001 | LaMarca et al. .......... 707/501.1 |
| 2002/0015064 | A1 | * | 2/2002 | Robotham et al. ........... 345/863 |
| 2002/0019827 | A1 | | 2/2002 | Shiman et al. .............. 707/200 |
| 2002/0073112 | A1 | | 6/2002 | Kariya ........................ 707/500 |
| 2002/0081997 | A1 | | 6/2002 | Morishima .................. 455/412 |
| 2002/0084991 | A1 | | 7/2002 | Harrison et al. ............. 345/173 |
| 2002/0120858 | A1 | | 8/2002 | Porter et al. ................. 713/200 |
| 2002/0186252 | A1 | | 12/2002 | Himmel et al. ............. 345/787 |
| 2003/0036393 | A1 | | 2/2003 | Kanefsky .................... 455/466 |
| 2003/0051212 | A1 | | 3/2003 | Narahara .................... 715/511 |
| 2003/0233419 | A1 | | 12/2003 | Beringer ..................... 709/206 |
| 2004/0203959 | A1 | | 10/2004 | Coombes .................... 455/466 |
| 2004/0259598 | A1 | | 12/2004 | Wagner et al. .............. 455/566 |
| 2004/0260756 | A1 | | 12/2004 | Forstall et al. .............. 709/200 |
| 2005/0138552 | A1 | | 6/2005 | Venolia ...................... 715/526 |
| 2005/0275638 | A1 | * | 12/2005 | Kolmykov-Zotov et al. . 345/179 |
| 2006/0246956 | A1 | | 11/2006 | Park et al. ................... 455/566 |
| 2007/0161400 | A1 | | 7/2007 | Sharp et al. ............... 455/550.1 |
| 2007/0213099 | A1 | | 9/2007 | Bast ........................... 455/566 |

OTHER PUBLICATIONS

Bergman, Ruth, et al., "A Personal Email Assistant", Software Technology Laboratory, HP Laboratories, Palo Alto, Aug. 22, 2002, 23 pages.

Bellotti, Victoria, et al., "Taking Email to Task: The Design and Evaluation of a Task Management Centered Email Tool", Proceedings of the Conference on Human Factors in Computer Systems, Ft. Lauderdale, Florida, Apr. 5-10, 2003, pp. 345-352.

Whittaker, Steve, et al., "Email Overload: Exploring Personal Information Management of Email", CHI 96, Apr. 13-18, 1996, pp. 276-283.

Venolia, Gina Danielle, et al, "Supporting Email Workflow", *Technical Report MSR-TR-2001-88*, Microsoft Research, Microsoft Corporation, Revised Dec. 2001 (Original Sep. 2001), 11 pages.

Weiss, Jiri, "Conferencing Software: No More Meetings"; *PC World*, vol. 13, No. 5, May 1995, pp. 161-169.

Smith, Mark, "Tools for Navigating Large Social Cyberspaces", *Communications of the ACM*, vol. 45, No. 4, Apr. 2002, pp. 51-55.

Rohall, Steven L., et al., "ReMail: A Reinvented Email Prototype", *CSCW '02*, Nov. 20, 2002, 4 pages.

Lam, Derek, et al., "Exploiting E-mail Structure to Improve Summarization", *ACM Conference on Information and Knowledge Management*, Nov. 9, 2002, 8 pages.

Kuriage, Keiko, "Parts Create Technique, Dreamweaver&Fireworks Web Design Technique for Windows", Japan, Mainichi Communications Co. Ltd., Jun. 19, 2001, pp. 26-27.

* cited by examiner

METHOD AND APPARATUS FOR SETTING ATTRIBUTES AND INITIATING ACTIONS THROUGH GESTURES

CROSS-REFERENCE TO RELATED APPLICATIONS

This application is related to the commonly owned co-pending U.S. patent applications entitled "Method and Apparatus for Indicating And Navigating Related Items," Ser. No. 10/745,481, and "System and Method for Viewing Information Underlying Lists and Other Contexts," Ser. No. 10/745,489, each filed herewith and incorporated by reference in its entirety.

FIELD OF THE INVENTION

The invention relates to a method and apparatus for setting attributes and/or initiating actions on an item by using specific gestures.

BACKGROUND OF THE INVENTION

Systems for presenting a list of items, such as email messages, are generally well known. Typically, only a small portion of text associated with these items is displayed in the list itself. If a user wishes to view more information, the user must select one of the items to additional information would be displayed in a separate area.

Often times, messages may be related, but appear scattered as separated items, making it difficult for a user to follow a complete discussion. Furthermore, in typical systems, a user wishing to mark a message for a particular action, such as urgent or delete, must move to a different area of the screen in order to accomplish this.

There are many situations in which people would like to view extended amounts of text, but are limited by the amount of display area or "screen real estate" available to them. For example, a user looking at a list of items might want to see or preview the detailed content text of one of the items, without looking to or covering up other areas of the display.

Another problem is that a user wishing to follow a discussion must sort through a list of scattered messages. This can make it difficult for users to locate related items, to notice if an issue raised in a message has already been handled by someone else, or to follow a discussion at all. This can be particularly difficult when using a portable device with a small display as there is less opportunity to see related items in a large displayed list. Furthermore, due to difficulties in entering text on many such devices, the cost of responding to a message that has already been handled by someone else is high.

Another problem is that conventional systems require a user wishing to mark an item for later action to move the cursor to a different region of the display or use keyboard controls. This is especially problematic in situations where screen real estate is limited, such as with handheld portable devices.

Other limitations and problems also exist.

SUMMARY OF THE INVENTION

The invention overcomes these and other limitations of existing systems.

One aspect of the invention relates to a system and method for setting attributes and initiating actions on list items in place.

In some embodiments, a user may invoke a gestural menu of attributes and/or actions by selecting an icon next to the desired message.

In some further embodiments, a user may mark an item for later action by moving the cursor in a particular manner.

In some further embodiments, a user may use gestures to perform tasks without selecting an icon. In some embodiments, the gestures are easily remembered and are analogous to how people think of things fro the most common operations.

In some embodiments, a user may be presented with sub-menus above or below the selected action.

Other objects and features of the invention will become apparent from the following detailed description considered in connection with the accompanying drawings that disclose embodiments of the invention. It should be understood, however, that the drawings are designed for purposes of illustration only and not as a definition of the limits of the invention.

DETAILED DESCRIPTION OF THE INVENTION

Figure 1:
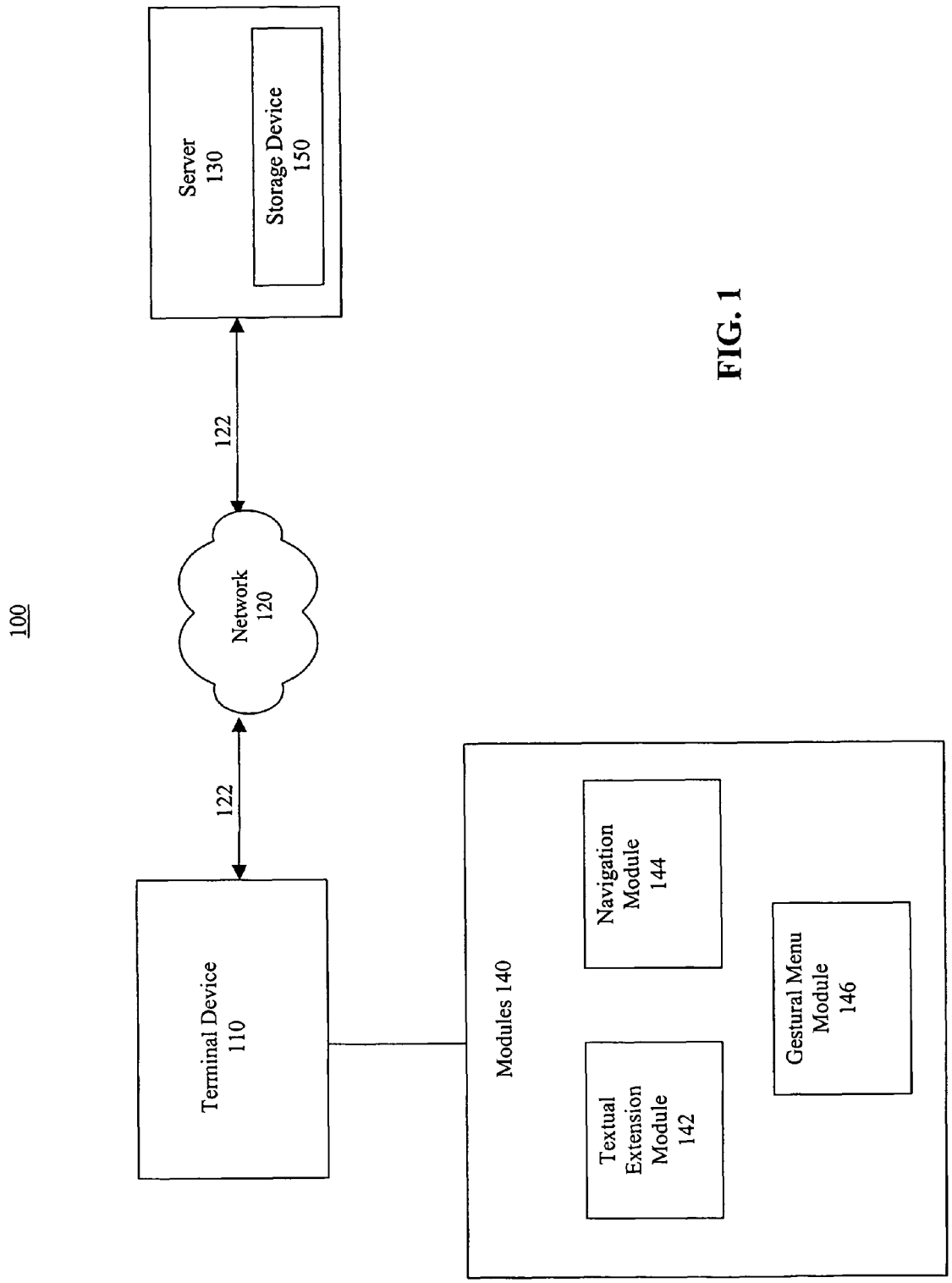
FIG. 1 illustrates a system according to an embodiment of the invention.

FIG. 1 illustrates a system 100 for performing various messaging operations, in accordance with the various embodiments of the invention. Though the invention is described in relationship to electronic mail, it is not so limited and other usages apply, as will become apparent. System 100 includes a terminal device 110 that retrieves electronic mail messages or other information from a server 130. Terminal device 110 may include one or more computer readable modules 140, such as a relationship module 142, a text extension module 144, and/or a gestural menu module 146, as well as other modules. These modules may enable a user to perform various features related to electronic mail messages. Computer readable modules 140 may be integrated with email software or may be separate modules, as would be apparent.

Relationship module 142 may identify related messages and allow a user to view related messages that are a part of the same discussion thread or activity. The threading relationships may be maintained using various threading services such as those described in U.S. patent application Ser. No. 10/334,087 (Publication No. US20030163537A1), entitled "Method and Apparatus for Handling Conversation Threads and Message Groupings as a Single Entity," filed Dec. 30, 2002, and U.S. patent application Ser. No. 09/995,151 (Publication No. US20030101065A1), entitled "Method and Apparatus for Maintaining Conversation Threads in Electronic Mail," filed Nov. 27, 2001, the specifications of which are herein incorporated by reference in their entirety. It should be noted that the invention is not limited to any particular mechanism for determining threads among a set of documents including email messages.

Text extension module 144 may enable a user to view additional text associated with a particular message. Gestural module 146 may allow a user to perform tasks related to a message using gestural motions and pop-up menus, for example, a user may make a quick pass through a list of messages and mark certain messages for later action. These features will be described in greater detail hereinafter.

As illustrated in FIG. 1, a storage device 150 may be utilized in connection with server 130. Although storage device 150 is shown on server 130, it will be appreciated that storage device 150 may be located at terminal device 110 or other locations accessible by terminal device 110. Storage device 150 stores messages and related actions at a central location.

Server 130 may be or include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

Terminal device 110 may be connected to server 130 over network 120 via communications link 122. Examples of terminal device 110 may include any one or more of, for example, a desktop computer, a laptop or other portable computer, a hand-held computer device such as a Blackberry, a Personal Digital Assistant (PDA), a web-enabled mobile phone, or a Palm Pilot, or any other terminal device.

Network 120 may include any one or more networks. For instance, network 120 may include the Internet, an intranet, a PAN (Personal Area Network), a LAN (Local Area Network), a WAN (Wide Area Network), a SAN (Storage Area Network), a MAN (Metropolitan Area Network), or other network.

Communications link 122 may include any one or more communications links. For instance, communications link 122 may include a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, or other communications link.

Figure 2:
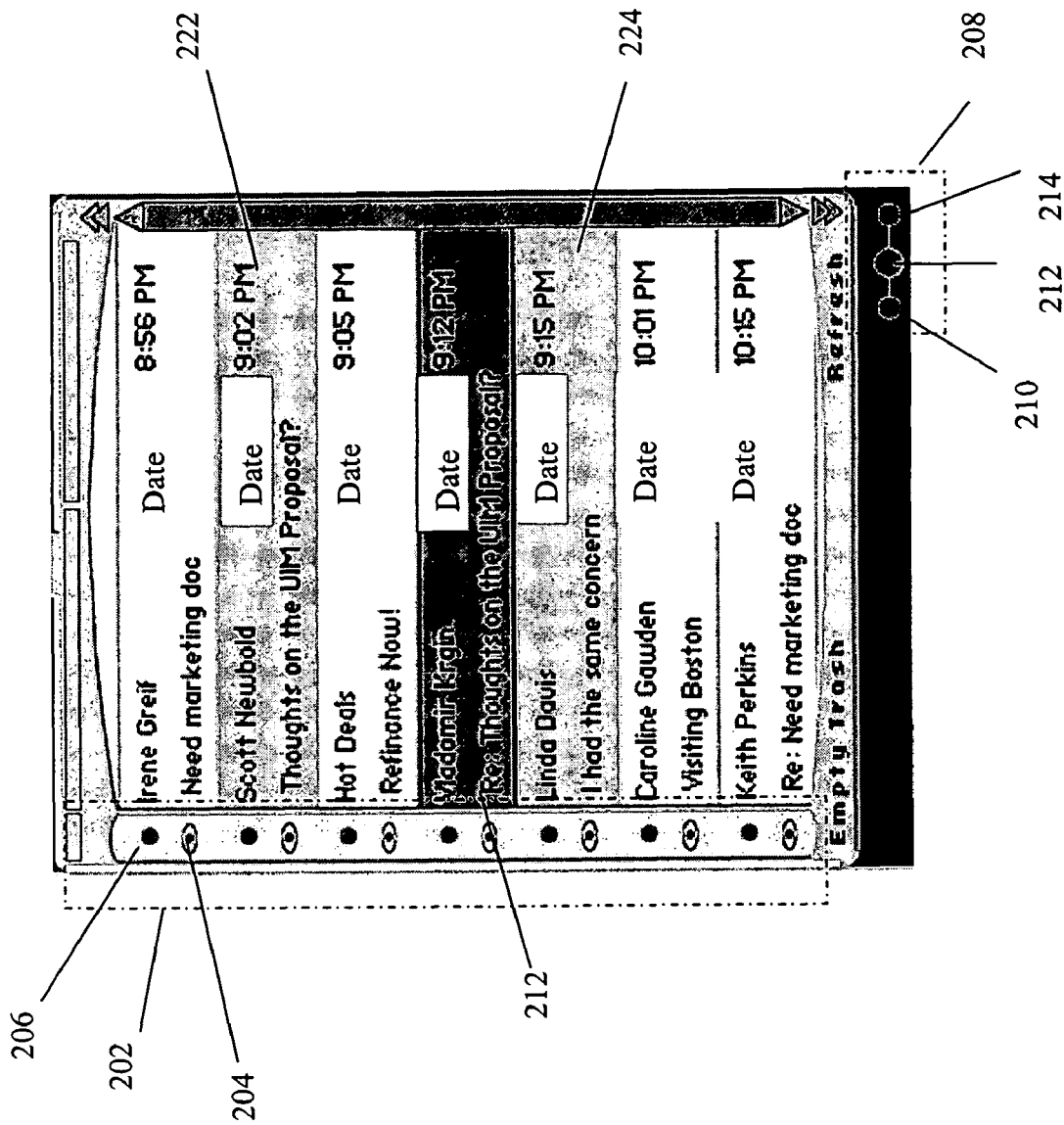
FIG. 2 illustrates a graphical user interface, according to an embodiment of the invention.

FIG. 2 illustrates a user interface 200 in accordance with various aspects of the invention. User interface 200 may include a control pane 202 including one or more control icons for advanced email features. These control icons may include a text extension icon 204, a gestural menu icon 206, and/or other control icons. In addition to the control icons, user interface 200 may include a relationship icon 208.

FIG. 2 illustrates an example view of a message list having related messages, according to one aspect of the invention. Related messages may be those messages within the same thread, concerning the same subject, from a particular person or group of persons, or otherwise related. Currently selected message 212 is set apart from other messages, for example by dark highlighting, as illustrated. Related messages 222 and 224 are also set apart or distinguished, for example, with light highlighting. While the date fields illustrated in FIG. 2 and other figures appear with different highlighting than the associated message, it would be apparent to one skilled in the art that the date fields may use the same highlighting as the associated message. Other mechanisms for setting apart or distinguishing messages from one another could be used as would be apparent.

Figure 3A:
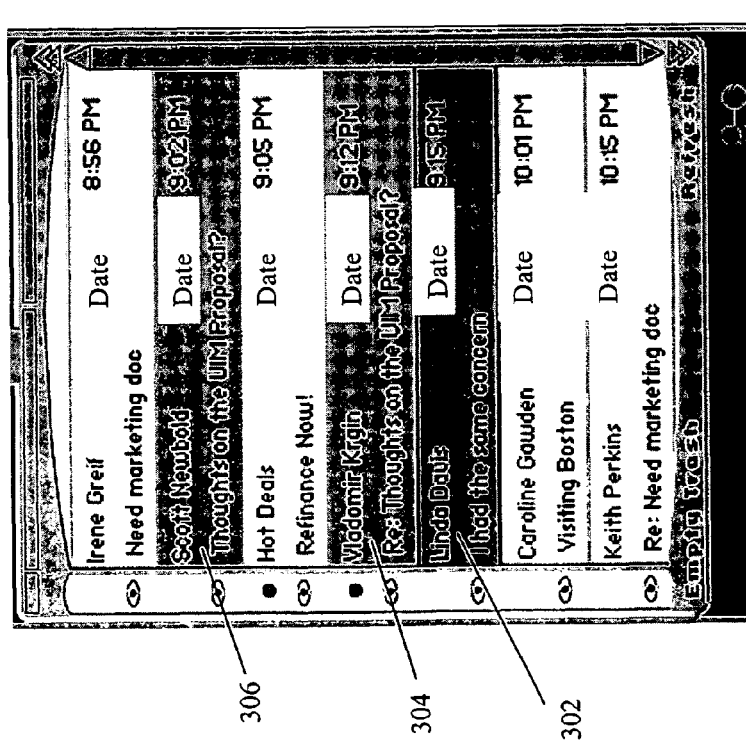
FIG. 3A illustrates a graphical user interface display in accordance with an embodiment of the invention.
Figure 3C:
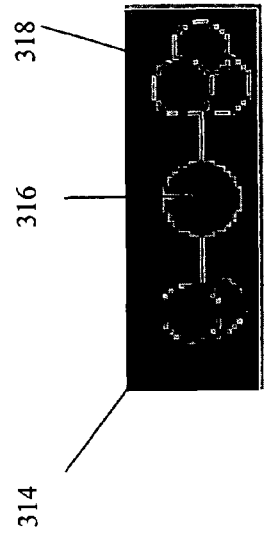
FIGS. 3B and 3C illustrate a relationship icon, according to an embodiment of the invention.
Figure 3B:
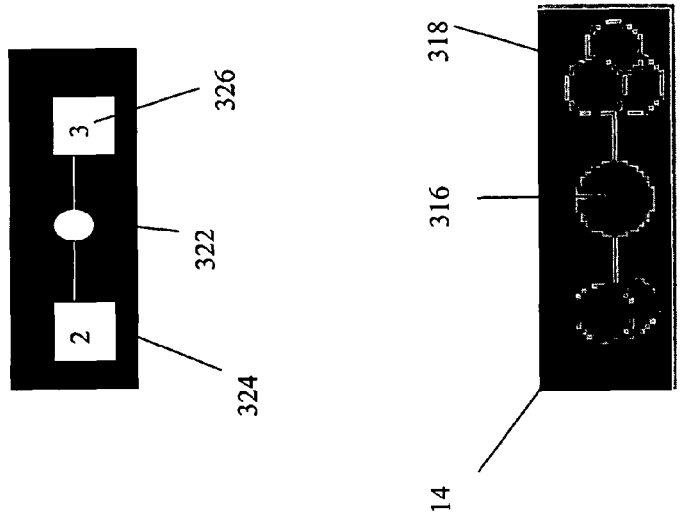

Relationship icon 208 may be used to navigate between the related messages and/or indicate the presence of related message. In one embodiment, relationship icon 208 may be used to indicate the presence of messages related to a currently selected message. For example, FIG. 3A illustrates a user interface with a message list having currently selected message 302 and related messages 304 and 306. Relationship icon 208 is shown as one or more circles. Clump of circles 310 may indicate the presence of multiple related messages and circle 312 may indicate a currently selected message. In addition to indicating the existence of related messages, relationship icon 208 may also indicate a temporal relationship. For example, relationship icon 208 may indicate whether the related messages occur before or after the selected message in time. As illustrated in FIG. 3A, relationship icon 208 indicates a clump of circles 310 corresponding to related messages 304 and 306 to the left of circle 312 indicating that they occur prior to the currently selected message. In some embodiments, relationship icon 208 may be a dynamic object, changing to reflect the number of messages before and after a currently selected message. For example, as illustrated in FIG. 3B, relationship icon 208 may comprise two clumps of circles: a clump of two circles 314 representing two previous related messages, a circle 316 representing a currently selected message, and a clump of three circles 318 indicating more that two future related messages.

In some embodiments, relationship icon 208 may also use other appearance changes to reflect the status of related messages. For example, a portion of relationship icon 208 may be displayed in bright red to indicate urgent related messages or may be displayed in green to indicate unread related messages. Other colors and/or visual indications may be used as would be apparent.

In some embodiments, relationship icon 208 may display the number of related messages. For example, FIG. 3C illustrates a relationship icon 208, having a circle 322 representing a currently selected message and numeric indicators 324 and 326 representing previous and future related messages respectively, and a corresponding number thereof. In other embodiments, a user may use an input device, such as a stylus or other input device, to "hover" over portions of relationship icon 208 indicating previous and future related messages and/or the number thereof. In some embodiments, a pop-up display may indicate the number of previous and/or future related messages. While shown as a collection of circles, other shapes or representations may be used with relationship icon 203 as would be apparent.

In some embodiments, relationship icon 208 may be used for navigating among related messages. For example, as illustrated in FIG. 2, relationship icon 208 may include of a first circle 210 for navigating to previous related messages, a circle 212 representing a currently selected message, and a circle 214 for navigating to future related messages. A user wishing to navigate to the next previous or future related messages may do so by selecting the appropriate portion of relationship icon 208.

Figure 4:
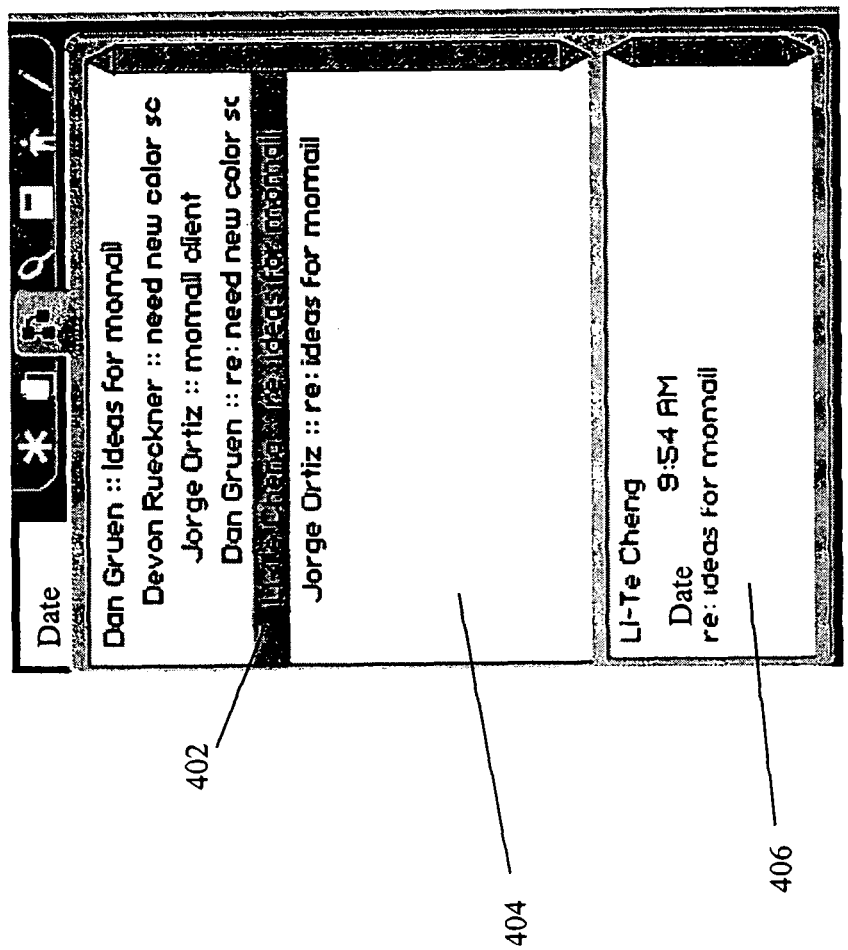
FIG. 4 illustrates an additional graphical user interface, according to an embodiment of the invention.

In some embodiments, relationship icon 208 may be used to bring up a hierarchical list of related messages. A user may invoke a hierarchical view by, for example, selecting circle 212 representing a currently selected message. FIG. 4 illustrates a user interface with a hierarchical view 400 of related messages according to one embodiment. Hierarchical view 400 may include, for example, hierarchical list 404 of related messages and text 406 of currently selected message 402. A user may choose to read one or more related messages by selecting it/them from hierarchical list 404.

Figure 5:
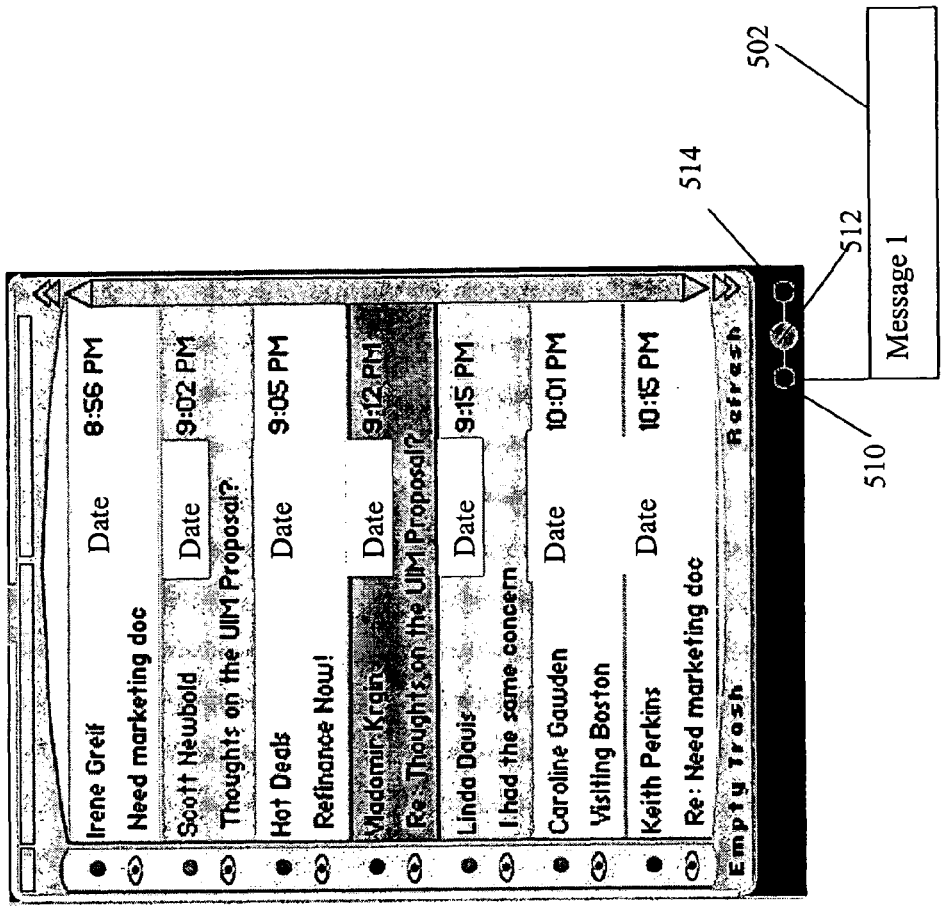
FIG. 5 illustrates another embodiment of a relationship icon, according to an embodiment of the invention.

In other embodiments, relationship icon 208 may be used for navigation of and identification of related messages. Relationship icon 208 may indicate the presence of related messages before and after a currently selected messages, and allow a user to move between related messages. For example, FIG. 5 illustrates a user interface with a relationship icon may be used for identification of and navigation among related messages. Relationship icon 508 may include a first circle or group of circles 510 indicating previous related messages, a second circle 512 representing a currently selected message, and a third circle or group of circles 514 indicating future related messages. A user may navigate to the next previous or future related message by selecting circle 510 or 514, respectively. In some embodiments, a list of related messages may be displayed when a user "hovers" over an icon. For example, as illustrated in FIG. 5, a list 502 of previous related messages may be displayed when a user moves an input device over the previous message circle 510. The user may then navigate to a specific message by selecting the message. Similar functionality may be provided for future related messages as would be apparent.

Figure 6:
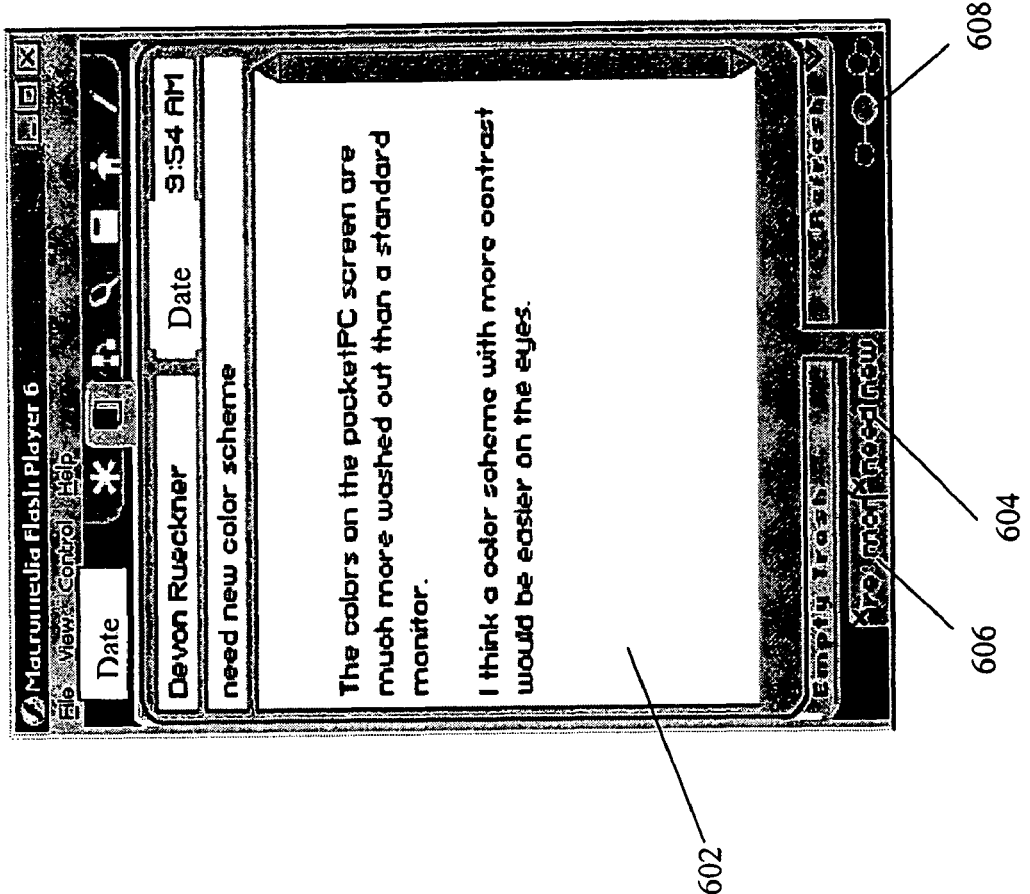
FIG. 6 illustrates an additional graphical user interface, according to an embodiment of the invention.

In some embodiments, a relationship icon may be used when a message list is not being displayed. As illustrated in FIG. 6, relationship icon 608, displayed with the context of an open message, may indicate the presence of related messages. A user viewing current message 602 may navigate to previous or future related message by using relationship icon 608 without having to return to a message list view. In some embodiments, tabs 604 and 606 may also be provided to enable a user to quickly navigate between current message and previously read messages. As illustrated, tab 604 represents the currently selected message and tab 606 represents a related message that has already been read. A user may quickly return to a message that has already been read by selecting the tab associated with that message.

While described above in relationship to electronic mail messaging, relationship icon may be used in other environments having a list of related items. For example, relationship icon may be used to identify related items in chat rooms, message boards, and other list environments.

Figure 7:
FIG. 7 illustrates a graphical user interface, according to an embodiment of the invention.

According to another aspect of the invention, a system is provided for enabling a user to view extended text underlying lists and other contexts. In some embodiments, a user may view extended text in-line without obstructing the view of other displayed items. An example user interface 700, according to one embodiment, is illustrated in FIG. 7. While described below in relationship to electronic mail messages, the invention is not so limited and other uses may, as will become apparent. Display 700 may include a list of message. Each message in list of messages may include a name field 702 indicating the sender of the message, a subject field 704 indicating the subject matter of the message, a date/time field 706 providing a timestamp for the message, and/or other message fields. User interface 700 may also include a text extension icon 710 for providing extended information for selected messages. These icons and the related fields are described further below.

Figure 8A:
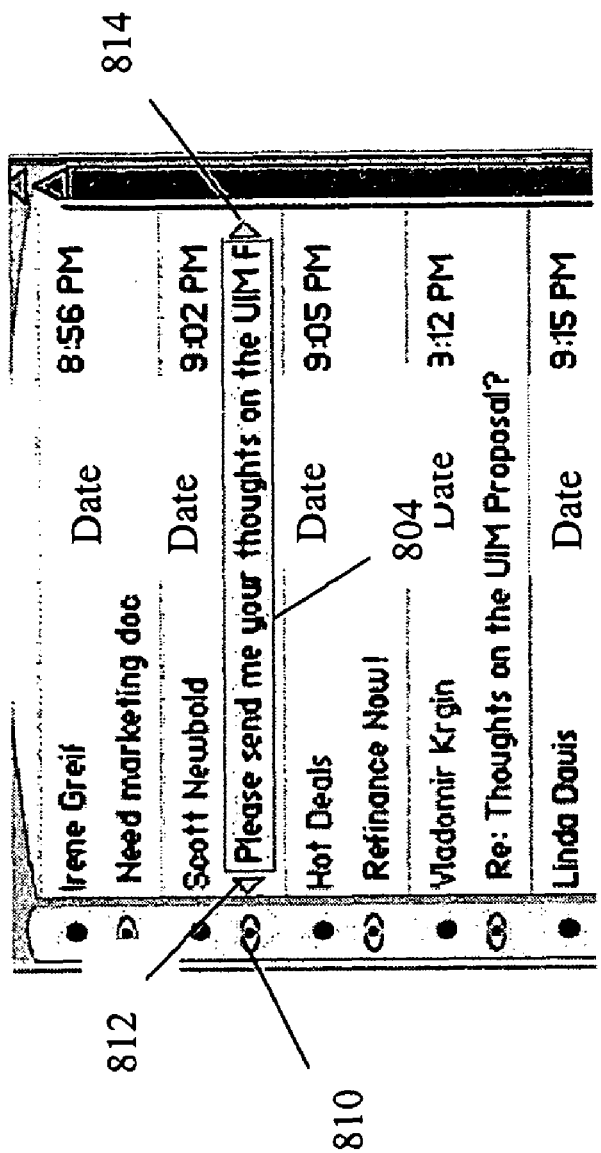
FIGS. 8A and 8B illustrate a graphical user interface using a text extension module, according to an embodiment of the invention.
Figure 8B:
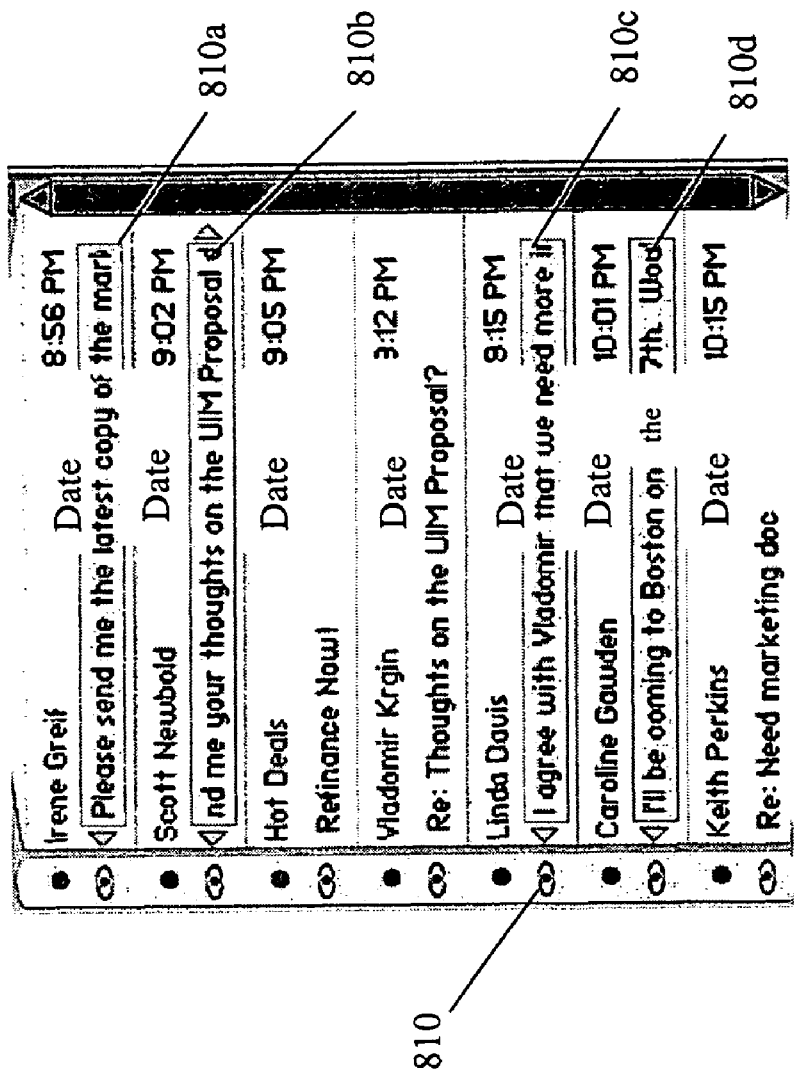

A user may view the extended information, such as detailed content of a particular message or field, by using text extension module 142. FIG. 8A illustrates a user interface with a list of messages after a user has selected text extension icon 810 for the selected message. Subject field 704 has been replaced by a scrolling field 804. Scrolling field 804 may include a left arrow 812 and a right arrow 814 that allow a user to scroll through additional text of the field without looking to another area of the screen. In some embodiments, the scrolling field 804 may also be set to scroll automatically. As illustrated in FIG. 8B, one or more scrolling fields, illustrated as scrolling fields 810a-d, may be used. One or more scrolling fields may be displayed by selecting a text extension icon 810 associated with the desired one or more message. A user may then scroll through the body text of one or more messages. A user may dismiss any of the scroll areas by, for example, clicking text extension icon 810 a second time.

In some embodiments of the invention, terminal device 110 is a handheld portable device with limited display. A user invoking text extension module 142 may view details of a selected message without obstructing the view of other displayed items.

Figure 9:
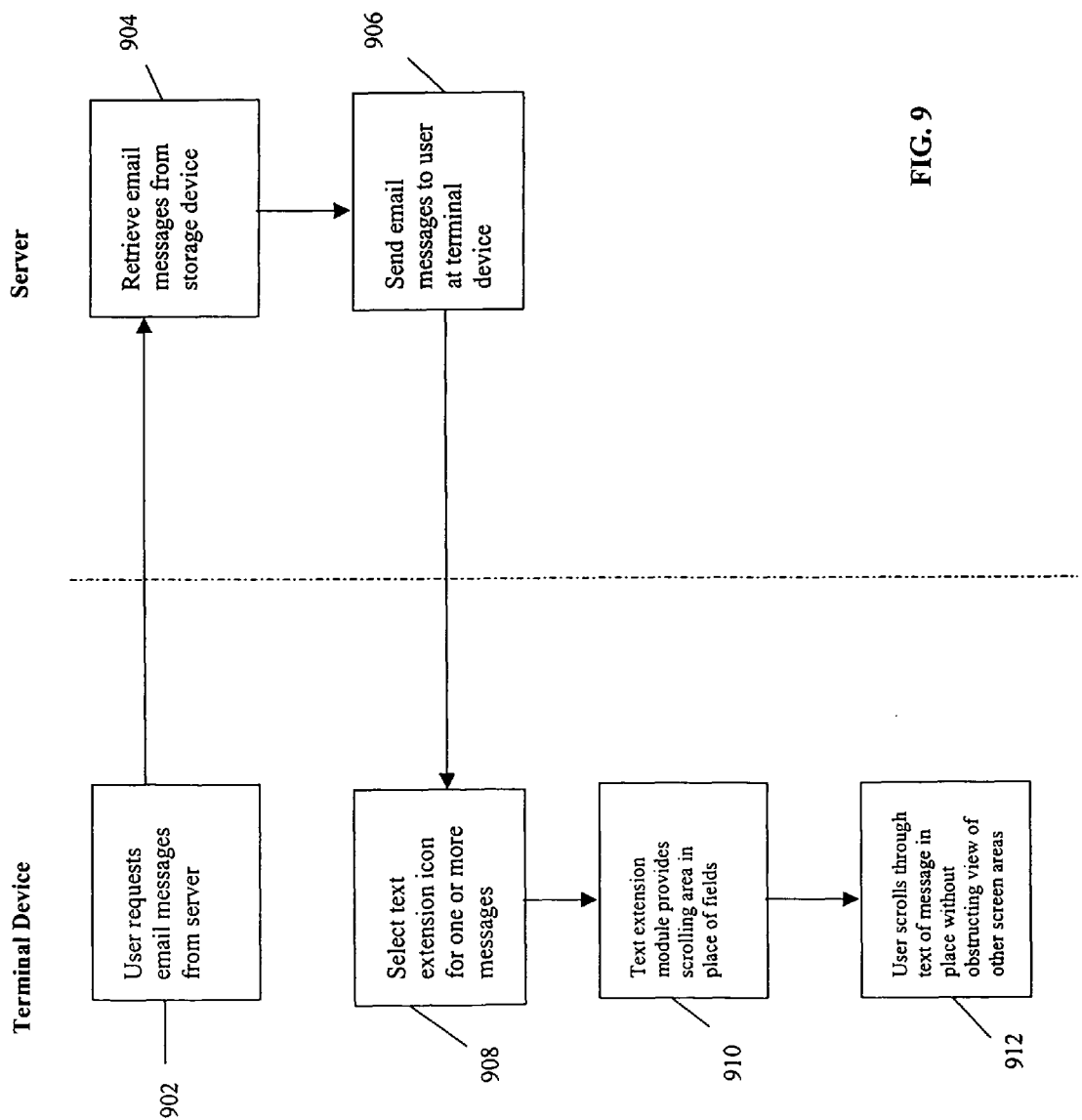
FIG. 9 illustrates a process for using a text extension module, according to an embodiment of the invention.

FIG. 9 illustrates an example of a process that may be used to view additional content associated with email messages. In an operation 902, a user at terminal device 110 may request email messages from server 130. In an operation 904, server 130 may then retrieve the email messages from storage device 150. In an operation 906, server 130 may send the retrieved email messages to the user at terminal device 110. While retrieving messages from a storage device and sending the retrieved messages to terminal device 110 is illustrated as occurring at server 130, it will be appreciated the messages may stored at and retrieved from terminal device 110 or other locations accessible by terminal device 110.

The retrieved messages presented to the user may appear on one or more lines having fields such as, for example name field 702, subject field 704, and a date/time field 706. The user may wish to view additional text associated with one or more of the retrieved messages. In an operation 908, the user may select text extension icon 208 related to the one or more desired messages. In an operation 910, test extension module may provide a scrolling field 804 in place of, for example, subject field 704.

In an operation 912, the user may then scroll through text associated with the one or more messages in place, without obstructing the view of other screen items. While not shown, the user may dismiss scrolling field 804 associated with any of the one or more messages by selecting text extension icon 208 a second time.

While the embodiments described above relate to email messages, it would be apparent that scroll regions may be created other than those for messages. For example, the scrolling fields may be used in lists of search results or tables of data.

Figure 10:
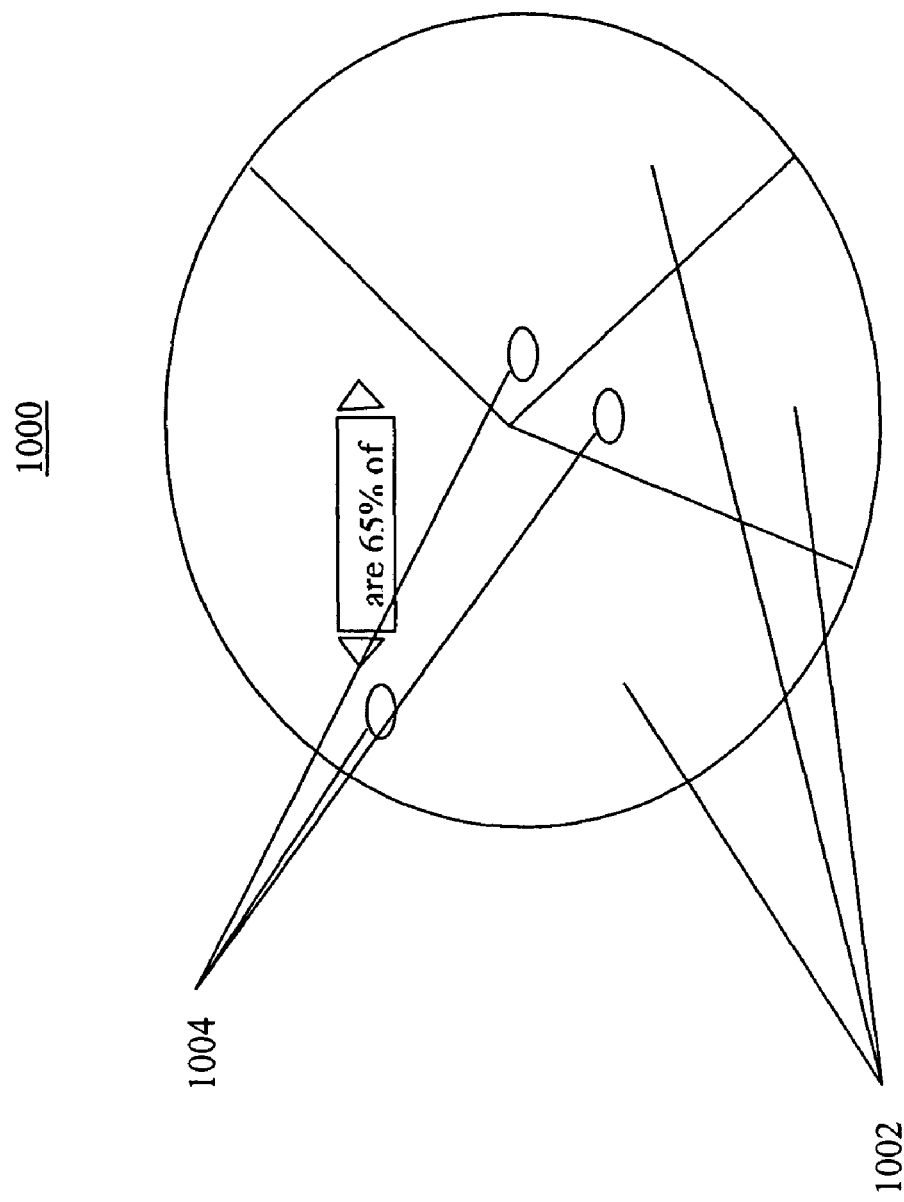
FIG. 10 illustrates a chart that uses a text extension module, according to an embodiment of the invention.

In some embodiments, text extension module 142 may enable a user to display underlying information in the context of another display or visualization, such as charts and graphs. For example, FIG. 10 illustrates a pie chart 1000 according to one embodiment of the invention. Pie chart includes several segments 1002 each having a text extension icon 1004. A user may view text associated with a segment of the chart by selecting text extension icon 1004. As illustrated, text related to the segment may be shown using a scrollable field 1006 in which additional information about the segment may be presented.

Figure 11:
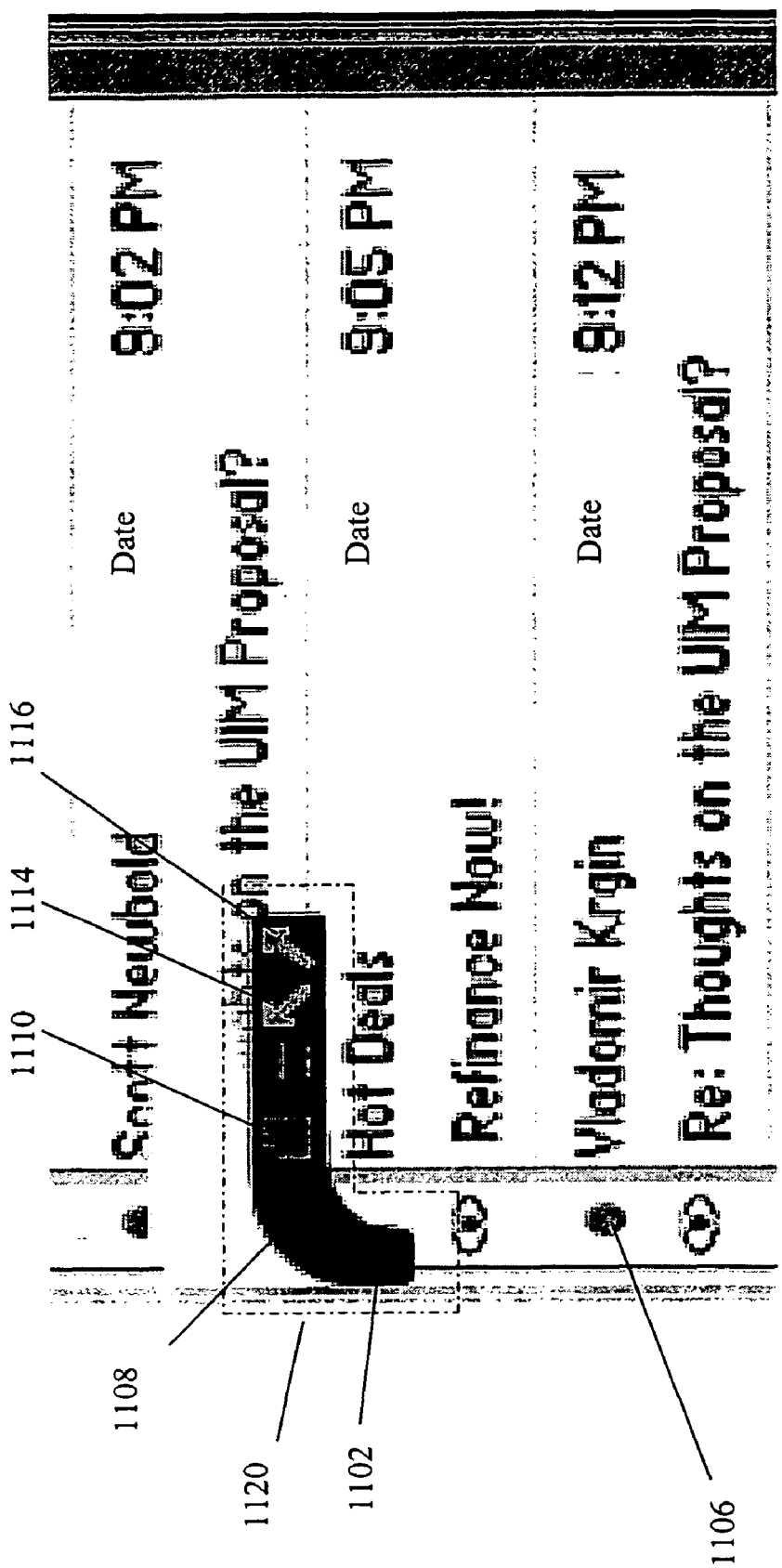
FIG. 11 illustrates a graphical user interface having a gestural menu, according to an embodiment of the invention.

Another aspect of the invention relates to a system and method for setting attributes and initiating actions through gestural menus. FIG. 11 illustrates a portion of a user interface with a message list in accordance with one aspect of the invention. A gestural menu icon 1106 is provided next to each message in the list. Selecting the gestural menu icon 1106 invokes a gestural menu 1120. Gestural menu 1120 may include various action icons for controlling and accessing messages as well as other known email actions. For example, gestural menu 1120 may include a delete icon 1102 for marking the current message for deletion, an urgent icon 1108 for marking the item urgent, a move-to-folder 1110 icon for moving a selected message to a desired folder, a reply icon 1114 for replying to the current message, and a forward icon 1116 for forwarding the current message. Other action icons may also be presented.

Figure 12A:
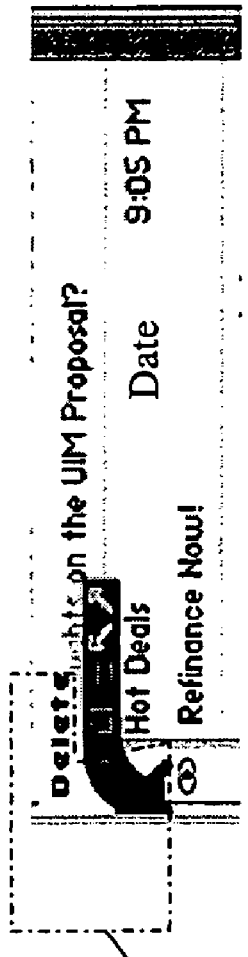
FIGS. 12A and 12B illustrates an example of marking an item for a particular action or attribute, according to an embodiment of the invention.
Figure 12B:
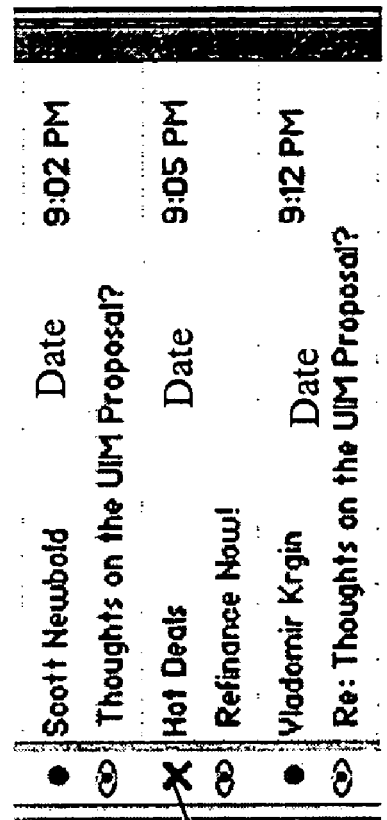

FIGS. 12A and 12B illustrate an example of marking a message for deletion. In FIG. 12A, delete icon 1102 has been invoked by navigating a cursor to delete icon 1102 and "hovering" over it. In some embodiments, when an action icon is selected or "hovered over", the icon may be enlarged and a description of its function may be provided, as illustrated at 1202. Once selected for a particular message, the gestural menu icon 1106 is replaced to reflect the selected action. As illustrated in FIG. 12B, the gestural menu icon 1106 has been replaced with delete icon 1204 indicating that the message has been deleted or marked for delete.

In some embodiments, a user may mark a message for a particular action without selecting an action icon from gestural menu 1120. For example, to mark a message for deletion, a user may select gestural menu icon 1106 associated with the message and drag it in a predetermined direction or outside of the screen display area. This "gesture" is analogous to throwing the item away. A user wishing to mark a message urgent may select the icon and drag it upward, a gesture analogous to raising the message to a higher importance. Other directional gestures may also be used.

Figure 13:
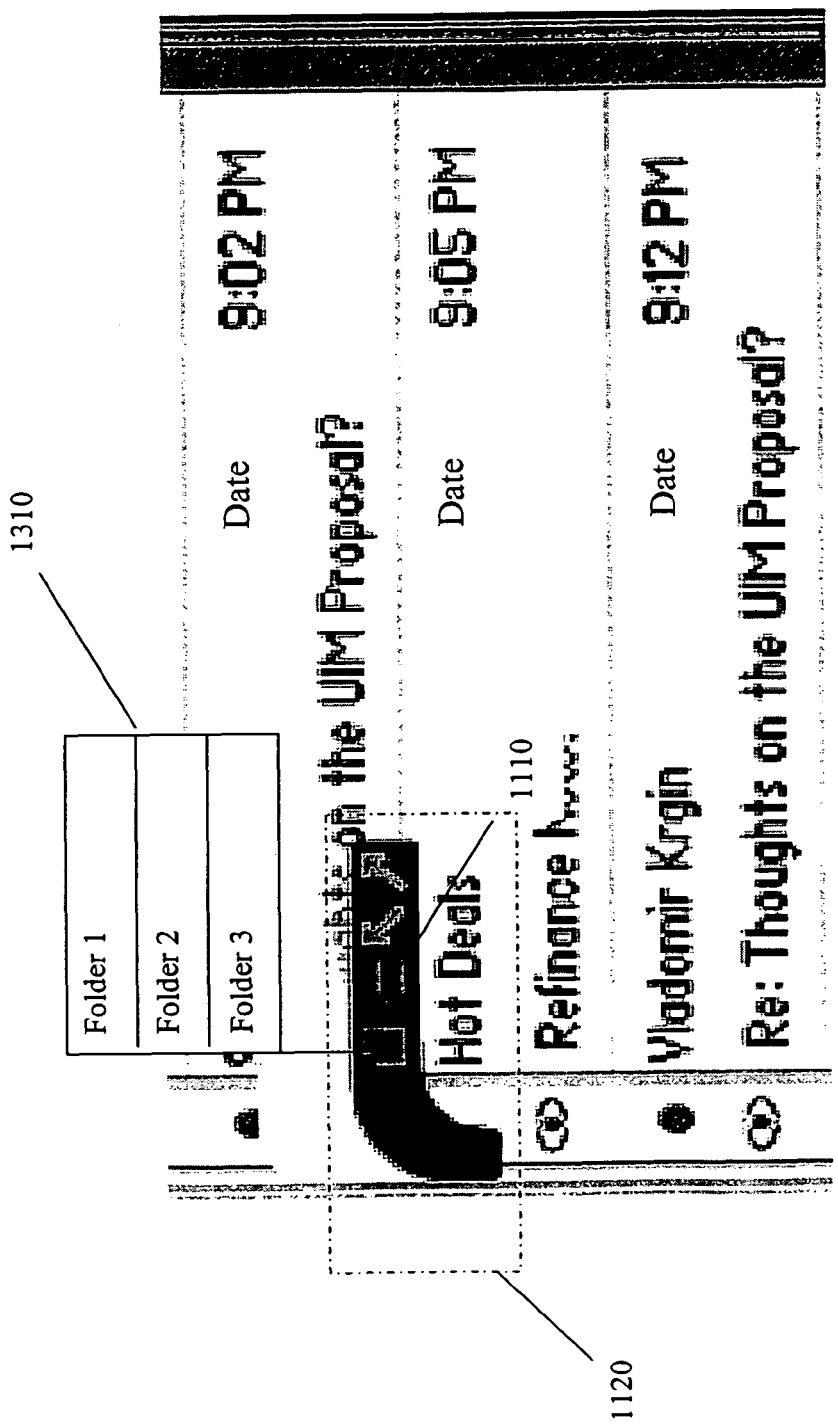
FIG. 13 illustrates another aspect of gestural menus, according to an embodiment of the invention.

In some embodiments, a user may be presented with submenus above or below the selected action. For example, FIG. 13 illustrates a user interface with a submenu 1310 for moving a selected message to a folder. Gestural menu 1120 includes a move-to-folder icon 1110. Navigating a cursor to mover-to-folder icon 1110 and "hovering" over it may invoke submenu 1310. A user may then select a desired folder into which to move the current message.

Figure 14:
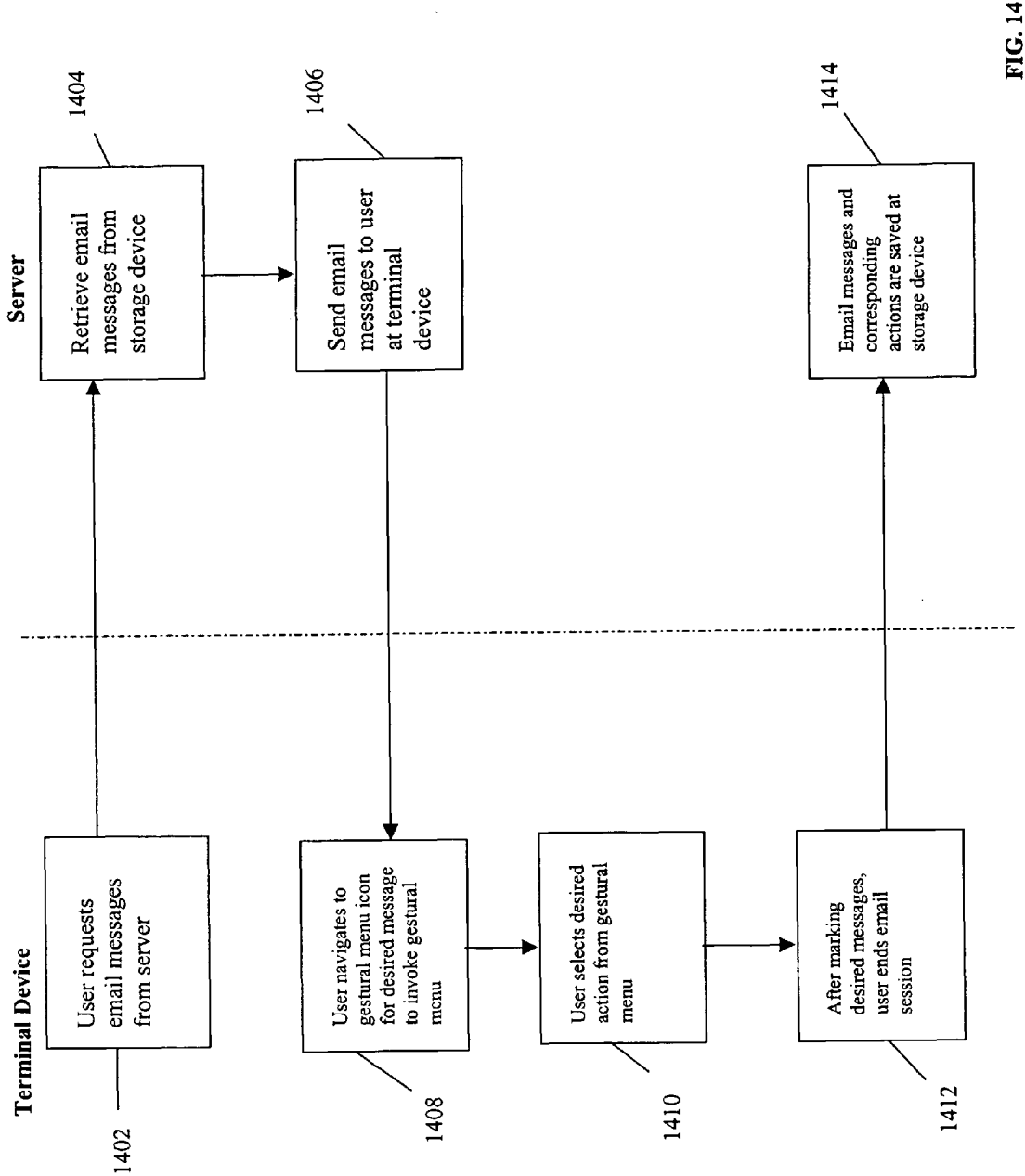
FIG. 14 illustrates a process for using a gestural menu module, according to an embodiment of the invention.

FIG. 14 illustrates an operation useful for setting attributes and initiating actions using gestural menus. In an operation 1402, a user at terminal device 110 may request email messages from server 130. In an operation 1404, server 130 may then retrieve the email messages from storage device 150. In an operation 1406, server 130 may send the retrieved email messages to the user at terminal device 110.

The user may wish to take a quick pass through the retrieved email messages. In an operation 1408, the user may navigate to a gestural menu icon associated with a desired message to invoke gestural menu 1120. In an operation 1410, the user may select a desired action from gestural menu 1120. While not illustrated, the user may select action icons for one or more messages by selecting the associated gestural menu icon.

Once a user has marked all desired messages, the user may end the email session, as illustrated in an operation 1412. In an operation 1414, email messages and corresponding actions are stored at storage device 150 and appropriate actions taken. While not illustrated, a user may later retrieve email messages via terminal device 110 or any other terminal device capable of connecting to storage device 150. The later retrieved email messages retain the actions previously selected. While retrieving messages from a storage device and sending the retrieved messages to terminal device 110 is illustrated as occurring at server 130, it will be appreciated the messages may stored at and retrieved from terminal device 110 or other locations accessible by terminal device 110.

While particular embodiments of the present invention have been described, it is to be understood that modifications will be apparent to those skilled in the art without departing from the spirit of the invention. The scope of the invention is not limited to the specific embodiments described herein. Other embodiments, uses and advantages of the invention will be apparent to those skilled in the art from consideration of the specification and practice of the invention disclosed herein. The specification should be considered exemplary only, and the scope of the invention is accordingly to be limited by the following claims.

What is claimed is:

1. A method for setting attributes and initiating actions for an item in a list of items displayed in a graphical user interface, the method comprising:
   presenting a list of items to the user via the graphical user interface;
   presenting, for each of said items, a gestural icon associated with and in close proximity to said item;
   providing an action icon menu having one or more action icons to the user in response to the user selecting said gestural icon associated with an item; and
   marking said associated item for a desired action from said action icon menu, wherein the user is allowed to cause said associated item to be marked without navigating to a different area of the display and said gestural icon is replaced with an icon indicating a selected action in response to the user performing a predefined gesture representing the selected action.

2. The method of claim 1 wherein marking said selected item further comprises:
   in response to the user selecting an action icon from said action icon menu, replacing said gestural icon with an icon indicating said selected action icon.

3. The method of claim 1 wherein said selected action is marking said item urgent and said predefined gesture comprises:
   selecting said gestural icon associated with said selected item with an input device; and
   moving said input device from said gestural icon in an upward direction.

4. The method of claim 1 wherein said selected action is marking said item for deletion and said predefined gesture comprises:
   selecting said gestural icon associated with said selected item with an input device; and
   moving said input device from said gestural icon towards the left side of the screen.

5. The method of claim 1 further comprising:
   storing said action associated with said item.

6. A non-transitory storage device storing a graphical user interface for setting attributes and initiating actions for an item, the graphical user interface comprising: means for presenting a list of items to the user via the graphical user interface; means for presenting, for each of said items, a gestural icon associated with said item to the user wherein said gestural icon is in close proximity to said item; means for providing an action icon menu having one or more action icons to the user wherein said action icon menu is presented in place of said gestural icon in response to the user selecting said gestural icon associated with one or more of said items; and means for marking said associated one or more items for a desired action from said action icon menu wherein the user is allowed to cause said associated one or more items to be marked without navigating to a different area of the display and said gestural icon is replaced with indicia indicating a selected action in response to the user performing a gesture representing the selected action.

7. The non-transitory storage device storing the graphical user interface of claim 6 wherein the means for marking said selected item further comprises: in response to the user selecting an action icon from said action icon menu, means for replacing said gestural icon with indicia indicating said selected action icon.

8. The non-transitory storage device storing the graphical user interface of claim 6 wherein said means for marking said selected item further comprises: means for selecting said gestural icon associated with said selected item with an input device; and means for moving said input device from said gestural icon in an upward direction to mark said item urgent.

9. The non-transitory storage device storing the graphical user interface of claim 6 wherein said means for marking said selected item further comprises: means for selecting said gestural icon associated with said selected item with an input device; and means for moving said input device from said gestural icon towards the left side of the screen to mark the item for deletion.

10. The non-transitory storage device storing the graphical user interface of claim 6 further comprising: means for storing said action associated with said item.

11. A graphical user interface visibly displayed on a terminal device for setting attributes and initiating actions for an item, the graphical user interface comprising:

a list of items;

a gestural icon associated with each of said items; and an action icon menu provided in response to the user selecting said gestural icon associated with one or more of said items, said action icon menu comprising one or more action icons;

wherein the graphical user interface is configured to:

mark said associated one or more items for a selected action in response to a user selecting an action associated with the action icon menu; and replace said gestural icon with an icon indicating the selected action in response to the user performing a predefined gesture representing the selected action.

12. The graphical user interface of claim 11 further comprising:

an indicia indicating said selected action wherein said indicia is presented in response to the user selection an action icon from said action icon menu and wherein said indicia replaces said gestural icon.

* * * * *